8853X
P. Pryer,
Cider Mill.
Patented May 29, 1835.
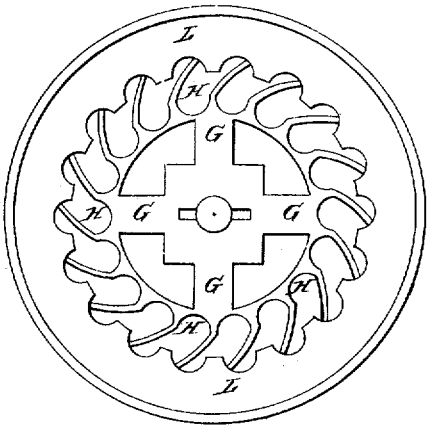
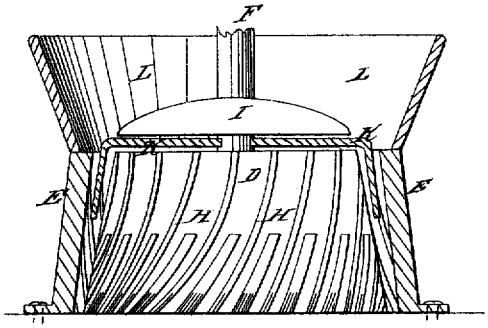
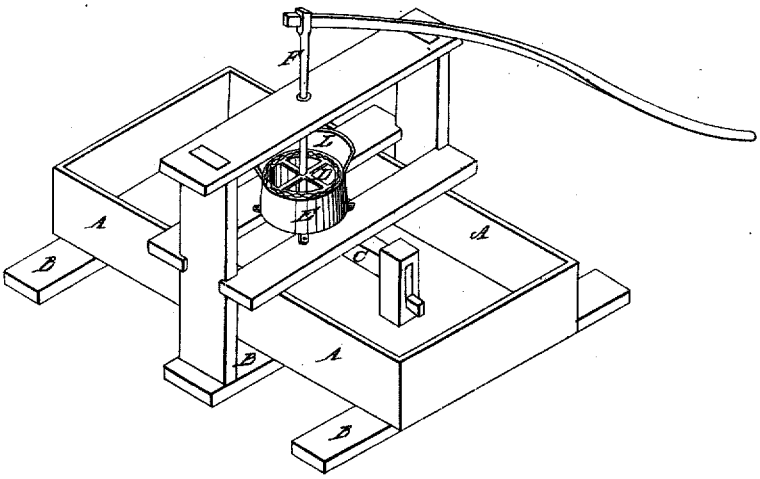
AM. PHOTO-LIT'HO. CO. N.Y. (OSBORNE'S PROCESS)

8853X May 24, 1835

Patented May 19, 1835

Philip Poyer, of Alexander, N. York.
Letters Patent

The schedule referred to in these Letters Patent and making part of the same containing a description in the words of the said Philip Poyer, himself of his improvement in a cast iron cider mill for the purpose of grinding apples.

To all to whom these presents shall come; Be it known that I Philip Poyer of Alexander, in the County of Genesee, and State of New York, have invented a new and useful cast iron cider mill for the purpose of grinding apples, and that the following is a full and exact description thereof. firstly it is a box or vat standing on three sills and built of 2 inch plank, the dimensions of which is or may be 12 feet in length, 6 feet in wedth and 2 feet deep, this vat has 2 posts placed on the inside 1 foot 10 inches long into which is placed a cross girt with a piece of cast iron 3 inches square placed on the center and top of the girt aforesaid for the gudgeon of the shaft to stand on, and into these posts there is a mortice in each into which there is two keys put for the purpose of raising or lowering the cross girt on which the inside cylender of the mill stands, in order to grind the apples coars, or fine also, 2 plank 6 feet 10 inches long and 1 foot wide which are dieftailed and boxed down on top of the vat for the outside cylender of the mill to stand on, and to be 14 inches apart, also 2 posts of plank 16 inches wide and 6 feet long, tenonted into the middle sill under the vat, and boxed into the ends of the cross pieces on top of the vat and placed on the outside of the vat with a plank 16 inches wide and a hole through the center of the same 8 inches in diameter and two morticies in each end of the same, and placed on the top of the last mentioned posts for the shaft to turn in. The mill is made of two cast iron cylenders the outside cylinder is 20 inches at the top 25½ inches at the bottom and 13 inches deep, the inside cylinder is 19¼ inches at the top 24 inches at the bottom and 13 inches deep. the inside cylinder has 4 arms at the top and bottom, and upon the inner part cast in a square forming an eye 8 inches square for a shaft of wood, or 3 inches square for a

8853X shaft of iron. the armes to be cast on or separate from the cylinder the top of the inside cylinder is divided into 36 parts on the convex side 18 of them to be 3/8 of an inch and 18 of them 3 inches in width the 3 inch spaces is fluted out in the form of a cemicircle and 1½ inches deep at the top and descending in a spiral or curved line and in a diminished debth from the top to the bottom at about one half of the distance from the top each flute of the cylinder is divided into 3 parts - the ~~pp~~ outside part continue to the bottom in the form of a flute and are about an 1/8 or ....3 16 ths of an inch deep at the botton. the convex parts of the cylinder which divides the flutes at the bottom is cut into 3 or 4 sharp edges which descend in a spiral or curved line the same as the flutes do the 18 parts of 3/8 of an inch which divide the flutes at the top descend to the bottom in a curved line and forms the principle edges for grinding; the outside cylinder has 4 pieces of 2 inches square and 3/8 of an inch thick cast on the external part of the bottom of equal distance apart with holes through the same for the purpose of bolting it down to the cross pieces. on top of the vat which cross pieces are cut out with a corresponding circle of the inside of the outside cylinder, the inside of the outside cylinder has the same number of flutes and is like the external part of the inside cylinder in every respect except the flutes and spiral or curved lines. turn in the opposite direction of the inside cylinder, the two cylinders when put together form 18 circles of 3 inches diameter each on top and may be made of a size or number to increase or diminish the number of the flutes or size of them to any dimensions required, the inside cylinder is to be hung on a shaft with a wing gudgeon in the bottom of the shaft and standing on a piece of cast iron put on the top and center of the cross girt above described and extending through the cup on top of the outside posts with a sweep on top of the same there is also a covering extending from the shaft to the inside cylinder of an oval form to conduct the apples to the flutes in the cylinders and an iron sweep through the shaft to drive the apples round, and of a length suitable to drop through the outside cylinder and a key through over the top of the same also a hopper on top of the outside cylinder - What I claim as my own invention and not previously known in the above described machine is the cast iron

8853X

7/9 cylinders with all of their above described particulars in form and use.

Witnesses

George Warner

Judah Willis

Philip Pryer (Drawing Made)

(975 words)

Exd
MGC